United States Patent [19]

Marten et al.

[11] 4,106,785

[45] Aug. 15, 1978

[54] WORKPIECE HOLDER FOR A VERTICAL BROACHING MACHINE FOR BROACHING ANNULAR WORKPIECES

[75] Inventors: Wolfgang Marten; Herbert Holstein; Gustav Esser, all of Solingen, Fed. Rep. of Germany

[73] Assignee: Oswald Forst Maschinenfabrik und Apparatebauanstalt GmbH, Solingen, Fed. Rep. of Germany

[21] Appl. No.: 757,665

[22] Filed: Jan. 7, 1977

[30] Foreign Application Priority Data

Jan. 7, 1976 [DE] Fed. Rep. of Germany ....... 2600272

[51] Int. Cl.² .............................................. B23B 31/16
[52] U.S. Cl. ........................................ 279/4; 279/110; 90/88
[58] Field of Search .................. 90/76, 87, 88; 279/4, 279/110, 114

[56] References Cited

U.S. PATENT DOCUMENTS

| 1,263,894 | 4/1918 | Hottinger ............................ 279/114 |
| 2,273,845 | 2/1942 | Drisser et al. ......................... 279/4 |

FOREIGN PATENT DOCUMENTS

| 1,178,033 | 5/1959 | France ..................................... 279/110 |
| 459,791 | 5/1928 | Fed. Rep. of Germany .......... 279/110 |
| 939,062 | 2/1956 | Fed. Rep. of Germany .......... 279/114 |

Primary Examiner—Gil Weidenfeld
Attorney, Agent, or Firm—Browdy and Neimark

[57] ABSTRACT

A workpiece holder for a vertical broaching machine for broaching annular workpieces is provided with at least two centering pieces for radial immobilization of the workpieces. The centering pieces are radially pressable against an annular surface of the workpiece by a common drive means. The centering pieces are displaced until they rest firmly against the radial surface of the workpiece, thus ensuring that diametrical tolerances of the workpiece are completely eliminated.

10 Claims, 5 Drawing Figures

WORKPIECE HOLDER FOR A VERTICAL BROACHING MACHINE FOR BROACHING ANNULAR WORKPIECES

FIELD OF THE INVENTION

The invention relates to a workpiece holder for a vertical broaching machine for broaching annular workpieces, especially for simultaneous broaching of two ball-bearing races in rings of homokinetic joints with a total of six ball-bearing races, whereby a holder for axial immobilization of the workpiece, a device for tangential immobilization of the workpiece, and a device for radial immobilization of the workpiece are provided if required.

BACKGROUND OF THE INVENTION

Homokinetic joints are known from U.S. Pat. No. 3,218,827. Like cardan joints, as they are known, they serve to transmit a rotary motion from a rotating part to another part driven in a rotary manner, when the axes of rotation of these two rotating parts do not coincide. Homokinetic joints consist essentially of an outer ring which is flanged to the driven part, for example the wheel of an automobile, and an inner ring, fastened to the driving part, for example the drive shaft of an automobile. The inner ring has the approximate shape of a spherical disk, so that it can turn and swivel in the outer ring, whose inner side has an approximately cylindrical shape. Grooves with approximately one-third circular cross section are provided in the outer surface of the inner ring and the inner surface of the outer ring, whereby a ball is mounted in each groove of the inner ring and the corresponding groove of the outer ring. These balls are prevented by a ball cage from falling out of the grooves, which therefore serve as ball-bearing races.

Joints of this type have the considerable advantage that in contrast to cardan joints, the driven part is not subjected to any rotary oscillation superimposed on the rotary motion, whereby such a superimposed rotary oscillation, occurring in cardan joints, is a function of the angle between the axis of the driving part and the axis of the driven part.

The grooves in the inner and outer rings, which serve as ball-bearing races, are not parallel to the axis of rotation of these rings, but are inclined at an angle to this axis. In addition, these grooves can always be inclined in the same direction. in other words parallel to one another or, alternatively, they can be inclined relative to one another, whereby the angle of inclination relative to the axis differs by some amount or is the same.

In a vertical broaching machine known from U.S. Pat. No. 3,799,030 for broaching such rings in homokinetic joints, a prismatic wedge is provided for tangential, axial, and radial immobilization of the workpiece on a workpiece holder located at the broaching location of the broaching machine, said wedge being supported on the one hand by wedge-shaped surfaces in a corresponding recess in a holding pin on the workpiece holder, and provided with an arcuate suface on its outer side, said surface fitting into a previously broached ball-bearing race, thereby guiding and immobilizing the workpiece axially, tangentially, and radially. When broaching a first pair of ball-bearing races, the prismatic wedge travels in the corresponding recess in the holding pin, with only one of its free ends engaged therein. The prismatic wedge has a surface in the vicinity of this free end which rests against the inside wall of the workpiece. These broaching machines with this workpiece holder have performed outstandingly in principle. However, the fact that tolerances for the bore in the workpiece are on the order of magnitude of several microns means that corresponding errors develop in the position of the grooves to be broached relative to the axis of symmetry of the workpiece.

SUMMARY OF THE INVENTION

The goal of the present invention is to design a workpiece holder of the type described hereinabove such as to allow absolutely error-free centering of the workpiece relative to the axis of symmetry of the workpiece.

This goal is achieved according to the present invention by providing at least two centering pieces for radial immobilization of the workpiece, said pieces being radially pressable against an annular surface of the workpiece by a common drive means. This measure ensures that diametrical tolerances of the workpiece are completely eliminated, since the centering pieces are displaced until they rest firmly against the annular surface of the workpiece. While the inner bore of the workpiece must be manufactured with a maximum accuracy of 7 microns in known workpiece holders, the use of the workpiece holder according to the present invention allows the bore tolerance to be increased to 70 to 100 microns or even more, i.e. the manufacturing cost for the workpiece to be broached is considerably reduced. The accuracy of the location of grooves to be broached becomes independent of the tolerance of the bore. The only requirement is that the annular surface of the workpiece against which the centering pieces rest must be turned so that it is round, but this is a completely problem-free operation.

If the centering pieces rest against the annular surface of the workpiece over a large area, two centering pieces will suffice, fitting around the workpiece and centering it radially on all sides. When, however, as is the normal case in practice, the centering pieces rest in a point-wise or linewise manner against the annular surface of the workpiece, it is advantageous and desirable to provide at least three centering pieces.

In a particularly advantageous embodiment of the invention, the centering pieces are pressable against the outside surface of the workpiece. According to an especially advantageous embodiment of the invention, a fixed inner ring, guiding the centering pieces tangentially, and an outer ring, which is rotatable through a small angle by means of the drive means, are provided, whereby pressure rollers are mounted in the outer ring said rollers resting against sloping guide surfaces on the centering pieces. In order to achieve a very high accuracy of centering and very high centering forces, it is advantageous for the guide surfaces to be inclinded at a small angle relative to the corresponding tangent to a circle around the center of the workpiece in the contact area between each guide surface and the corresponding pressure roller. Absolutely uniform centering forces and simple centering can be achieved independently of the outside diameter of the workpiece if, according to an advantageous embodiment, the drive means is made in the form of bilaterally actuatable hydraulic drive means.

As can be seen from the above, centering can also be accomplished by applying the centering pieces to the inner surface of the bore, in other words an inner annular surface of the workpiece, and pressing them against the latter.

Further advantages and features of the invention will be evident from the description of a sample embodiment with reference to the drawings.

DETAILED DESCRIPTION OF PREFERRED EMBODIMENTS

Figure 1:
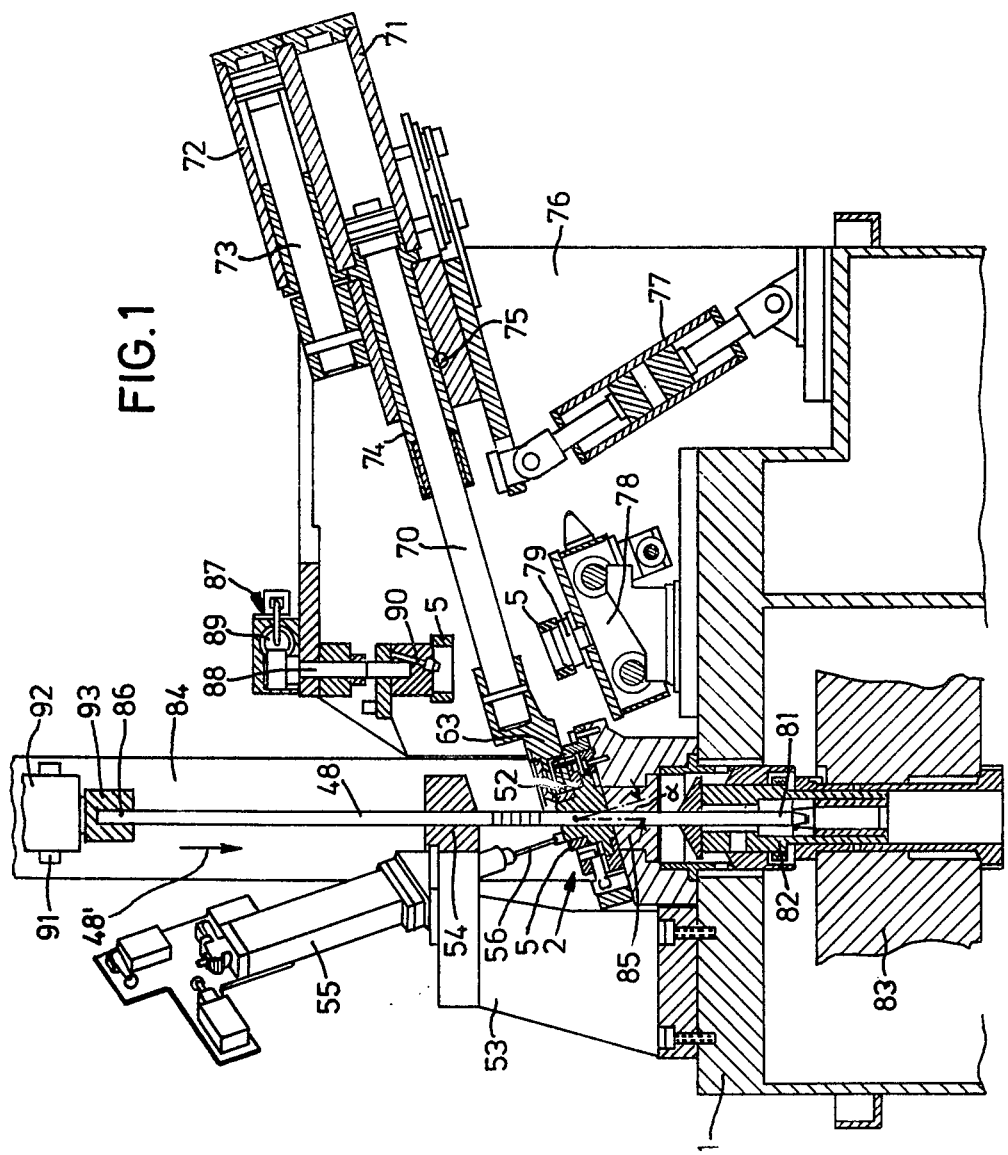
FIG. 1 shows the important parts of the vertical internal broaching machine for broaching outside rings for homokinetic joints, with a workpiece holder according to the invention, in vertical lengthwise section.
Figure 2:
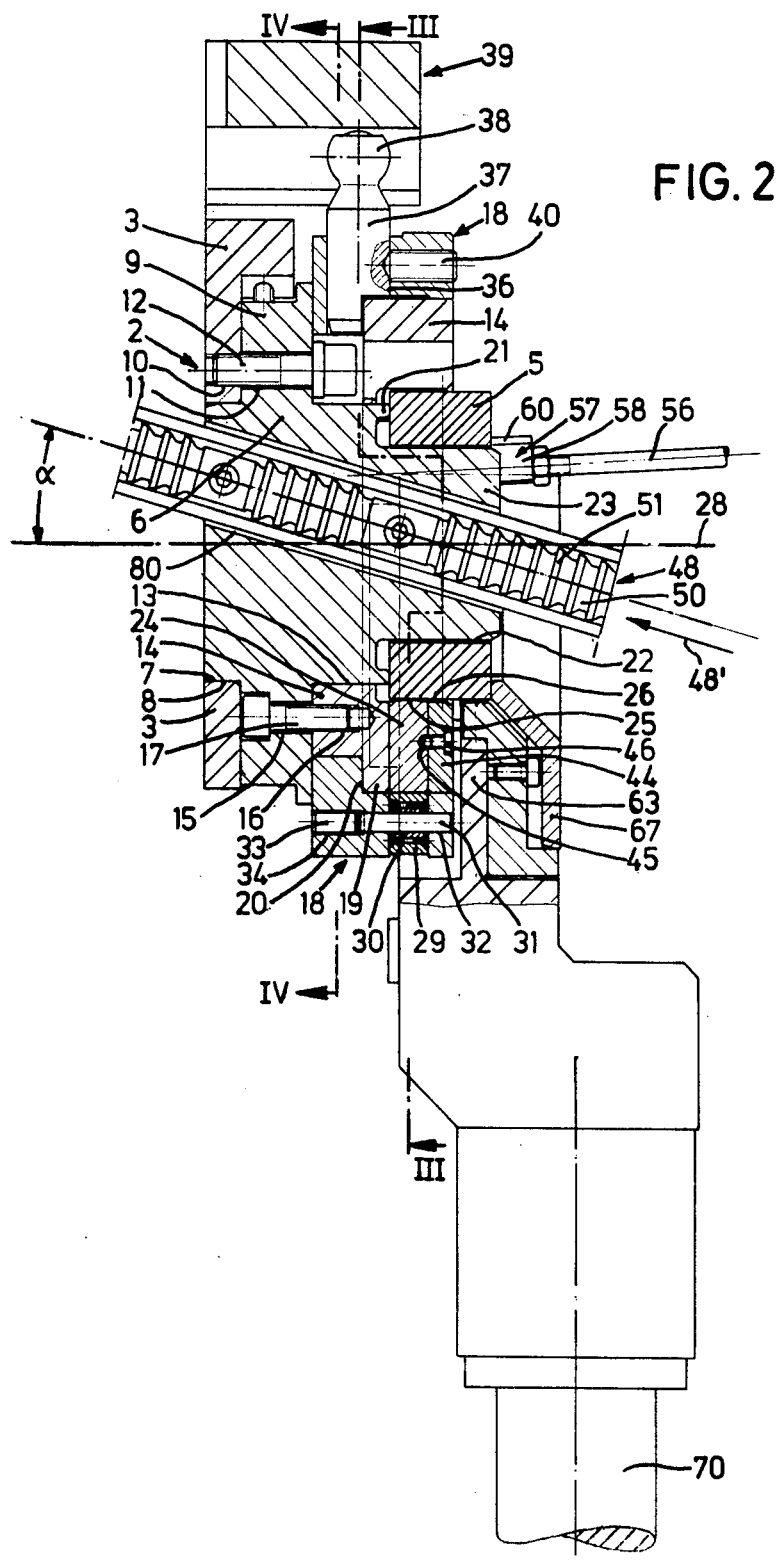
FIG. 2 shows a vertical central lengthwise section through a workpiece holder on an enlarged scale.

A workpiece holder 2 is mounted on a machining table 1. Workpiece holder 2 is provided with a mounting plate 3, firmly bolted to machining table 1 by means of bolts 4. In turn, a holding element 6 to hold a workpiece 5 is fastened to mounting plate 3. The holding element is provided with a centering projection 7 on its underside, said projection fitting into a corresponding recess 8 in mounting plate 3, whereby holding element 6 is immobilized radially relative to mounting plate 3. Above centering projection 7, holding element 6 is provided with an annular flange 9, said flange having its underside resting flat against the upper side of mounting plate 3, whereby the vertical position of holding element 6 is fixed. Holding element 6 is firmly bolted to mounting plate 3 by bolts 12 fitting through bores 10 in annular flange 9 and threaded bores 11, coaxial therewith, in holding plate 3. Three bolts 12 are provided, located equal angular distances apart.

As inner ring 14 is mounted above annular flange 9, around an annular cylindrical segment 13 of holding element 6. Bores 15 are located in annular flange 9, each displaced 60° relative to bores 10, said bores 15 being coaxial with corresponding threaded bores 16 in inner ring 14. Bolts 17 are screwed through bores 15 into threaded bores 16, whereby inner ring 14 is immobilized radially and axially against holding element 6.

An outer ring 18 is immobilized axially and radially by inner ring 14, said outer ring 18 being rotatable relative to inner ring 14 and holding element 6. Outer ring 18 has its undeside resting on the upper side of annular flange 9. An annular projection 19, extending radially outward, on inner ring 14 fits over a corresponding projection 20 on outer ring 18, thereby axially immobilizing the latter.

Approximately circularly cylindrical workpiece 5 rests axially on a support projection 21 mounted on the circularly cylindrical section 13 of holding element 6. It has a certain amount of play radially relative to inner ring 14 which surrounds it externally for a portion of its height, and relative to holding pin 23 of holding element 6 which is located in its cylindrical bore 22.

Three radially extending and radially displaceable centering pieces 24 are mounted at equal angular distances from one another in inner ring 14, said pieces being provided with an arcuate support surfaces 25, said surface being pressed against the cylindrical outer surface 26 of workpiece 5, whereby centering and radial immobilization of workpiece 5 is accomplished in a manner to be described below. Guide surface 27 of each centering piece 24, located radially outside, and therefore oppositely disposed with respect to support surface 25, is made diagnonal, i.e. it is not formed by a cylindrical surface around the axis of symmetry 28 of workpiece holder 2.

Pressure rollers 29 are mounted in outer ring 18, each of said rollers resting against a centering piece 24 at each guide surface 27. Pressure rollers 29 are mounted by means of needle bearings 30 on a shaft 31, said shaft being mounted in a corresponding bore 32 in the outer ring. Shaft 31 is axially immobilized in such manner that its lower end is made in the form of threaded section and the corresponding part of bore 32 is made in the form of a threaded bore 34, into which threaded section 33 is screwed. Since guide surfaces 27 of centering pieces 24, opposite the corresponding tangential surfaces, are inclined relative to pressure rollers 29, centering pieces 24 are displaced radially inward when outer ring 18 is rotated clockwise as indicated by arrow 35 in FIG. 3, whereby their support surfaces 25 are pressed against outside surface 26 of workpiece 5. When outer ring 18 is rotated in the opposite direction, centering pieces 24 can again lift off outer surface 26 of workpiece 5. The inclination of guide surfaces 27 is small, i.e. radial displacement of centering pieces 24 by a maximum of 1 mm is possible.

For rotation of the outer ring, the latter is provided with a drive pin 37 mounted in a corresponding bore 36 and projecting radially outward, said pin having its outer universal ball joint-shaped end meshing with a hydraulic drive means 39. Drive pin 37 is prevented from moving by means of a threaded pin 40 in outer ring 18. Two hydraulic pistons 41 and 42 are applied bilaterally to the universal ball joint-shaped end 38 of drive pin 37, said pistons being pressurizable at their outer ends by means of hydraulic fluid. When hydraulic pistons 41 are pressurized with working fluid, outer ring 18 rotates in the direction shown by arrow 35, i.e. centering pieces 24 are displaced radially inward. On the other hand, if hydraulic piston 42 is pressurized with working fluid, outer ring 18 rotates in the opposite direction, i.e. centering pieces 24 are released.

Centering pieces 24 are mounted in corresponding recesses 43 in inner ring 14, said ring being sealed by means of a cover 44 screwed onto inner ring 14. Each cover 44 is provided with a set screw 46 fitting into a corresponding hole 45 in centering piece 24. Hole 45 is sufficiently larger than the corresponding diameter of set screw 46 that the described radial displacements of each centering piece 24 are possible without centering pieces 24 being able to fall out radially inward from recesses 43 when no workpiece 5 is mounted on holding pin 23.

Workpiece holder 2 described above serves to hold workpieces 5 from which the outer rings of so-called homokinetic joints are manufactured, for which purpose ball-bearing races 47, alternately inclined relative to one another and relative to axis of symmetry 28, are broached in the cylindrical inner bore 22 of workpiece 5. For this purpose, a broach 48 is used, whose broach body 49 has cutters 50, with cylindrical broaching teeth 51, mounted laterally thereon.

A broaching machine in which the workpiece holder described above can be used is described and shown in detail in U.S. Pat. No. 3,799,030 of the present assignee, to which express reference is made and which is hereby incorporated by reference. For this reason, a brief discussion of the machine will suffice. A workpiece 5 is mounted on workpiece holder 2 by means of a "mask" 52. A hydraulic immobilizing cylinder 55 is mounted on a holder 53, by means of which an upper broach guide 54 is supported relative to machining table 1, said cylinder being provided with a prismatic wedge 57 on its piston rod 56. Prismatic wedge 57 is provided with two sloping surfaces 58, resting in a corresponding wedge-shaped recess 59 in holding element 6, whereby wedge 57 is firmly guided tangentially against holding element 6. It is provided on its outer surface with an arcuate surface 60, so designed that this arcuate surface 60, when inserted into a previously broached ball-bearing race 47, comes to rest against the surface of ball-bearing race 47 at two support points 61 and 62 located relatively far apart, whereby workpiece 5 is immobilized tangentially in an exact position relative to workpiece holder 2.

Mask 52 is fastened to a holding plate 63. Holding plate 63 is provided with a recess 64, so curved that an annular workpiece 5 can be pushed thereinto. A support ring 65 is mounted by threaded bolts 66 to the underside of support plate 63 and fits around the lower edge of workpiece 5, so that workpiece 5 cannot fall outdownward from recess 64. Workpiece 5 is held at the top by a thrust washer 67, pressed firmly against the upper side of each workpiece 5 by means of spring-loaded bolt 68, so that it is held between support ring 65 and thrust washer 67 and cannot accidentally slide out forward. The force of spring 69 which tensions bolt 68 is so great that on the one hand workpiece 5 is held in position, but on the other hand, by applying an appropriate force, workpiece 5 can be slid into or out of recess 64. Support ring 65 is dimensioned out downward that it rests against support projection 21 of support piece 6.

Support plate 63 which supports mask 52 is attached to two piston rods 70 of two hydraulic actuating cylinders 71.

An additional hydraulic working cylinder 72 is attached to these actuating cylinders 71, the piston rods 73 thereof being supported in a fixed manner together with a guide 74 for piston rods 70 in such manner that they are swivelable around an axis 75 over the side walls 76 on machining table 1. Actuating cylinder 71 and hydraulic actuating cylinder 72 are axially displaceable relative to guide 74 and can be swiveled therewith around axis 75. A double-acting lifting cylinder 77 is provided for swiveling around axis 75, and mask 52 mounted on piston rod 70 can be swiveled by means of this lifting cylinder 77 around axis 75. After a workpiece 5 on a carrier 78 has arrived in front of a workpiece holder 2 which constitutes a broaching position, it is gripped by mask 52. For this purpose, actuating cylinder 71 and hydraulic working cylinder 72 travel to their innermost positions (at the right in FIG. 1), whereby each piston 70 travels all the way into corresponding actuating cylinder 71. Lifting cylinder 77 is then in its lowest position. By actuating working cylinder 72, whose piston rod 73 is immovably attached at its outer free end, actuating cylinder 71, hydraulic working cylinder 72, and piston rod 73 of the latter travel sufficiently far (toward the left in FIG. 1) that workpiece 5 slides into recess 64 in mask 52 on guide element 79 of carrier 78. Then lifting cylinder 77 is acuated until piston rods 70 reach a slightly higher position than that shown in FIG. 1. Then actuating cylinder 71 is actuated in such manner that its piston rod is pushed completely out. By means of a subsequent slight lowering of lifting cylinder 77, mask 52 with workpiece 5 is lowered onto workpiece holder 2, whereby workpiece 5 is supported on support projection 21. Then workpiece 5 is centered by means of centering pieces 24 in the manner described above. Then broach 48 is introduced from above into a corresponding recess 80 in workpiece holder 2 and grasped by a shank holder 82 at its shank 81. Shank holder 82 is fastened to a broaching slide 83, which is moved downward by the pistons of two hydraulically actuated main drive cylinders. During this broaching operation, broach 48 is guided out of upper broach guide 54 into lower broach guide 85 located beneath workpiece holder 2. The upper end section 86 of broach 48 is not gripped during the actual broaching operation. Broach 48 is pulled all the way through workpiece 5 to be broached in the direction of arrow 48'. Then lifting cylinder 77 is raised slightly and piston rod 70 slides into actuating cylinder 71. Then lifting cylinder 77 moves all the way out, so that mask 52 with workpiece 5 reaches a separating device 87. A shaft 88 is provided in the separating device, said shaft being swivelable around its lengthwise axis by a toothed rack which is displaceable lengthwise. Two fingers 90 are located at the bottom on shaft 88, said fingers fitting into two grooves, said grooves being opposite one another and already broached, and serving as ball-bearing races 47, said fingers, by means of rotating of shaft 88 through 120°, causing workpiece 5 to rotate with them.

At the same time that workpiece 5 is separated, a tool carriage 92, guided between the two main drive cylinders 84 by means of rollers 91, moves downward, and an end piece holder 93 is mounted on this carriage for broach 48. At the same time, lower shank holder 82 again travels upward until the end piece 86 of broach 48 projects above upper broach guide 54. Then end piece 86 of broach 48 is gripped by endpiece holder 93 and pulled all the way up, whereby shank holder 82 is opened. Broach 48 is then pulled upward until it is guided into upper broach guide 54. Then workpiece 5, located in mask 52 and rotated through 120°, is returned to the same workpiece holder 2. Then precentering is accomplished by means of centering pieces 24, i.e. they are pressed only lightly against outer surface 26 of workpiece 5. Then the workpiece is immobilized tangentially by insertion of prismatic wedge 57, whereby curved surface 60 of the latter rests against support point 61 and 62 in previously broached groove-like ball-bearing race 47. Then complete radial centering takes place, whereby centering pieces 24 are pressed firmly against outside surface 26 of workpiece 5. Thn broach 48 is lowered and its shank 31 is again gripped by shank holder 82. A new broaching operation then begins. The same procedure is repeated once more, so that a total of six groove-like ball-bearing races 47 are broached.

Then workpiece 5 is again lowered to guide element 79 of carrier 78 and fed to a release device.

Of course, a plurality of workpiece holders 2 can be mounted side by side on machining table 1, so that a plurality of broached openings can be made simultaneously. In this case, a plurality of masks 52 and a plurality of broaches 38 are also provided.

Axis of symmetry 28 is inclined relative to the vertical and therefore the direction of movement of broach 48 is inclined by an angle alpha so that ball-bearing races 47 will be inclined relative to the central lengthwise axis 38 of workpiece 5.

Drive means 39 is likewise attached to matching table 1 by bolts. It is supplied with working fluid by pressure lines 94 which are merely indicated.

Figure 3:
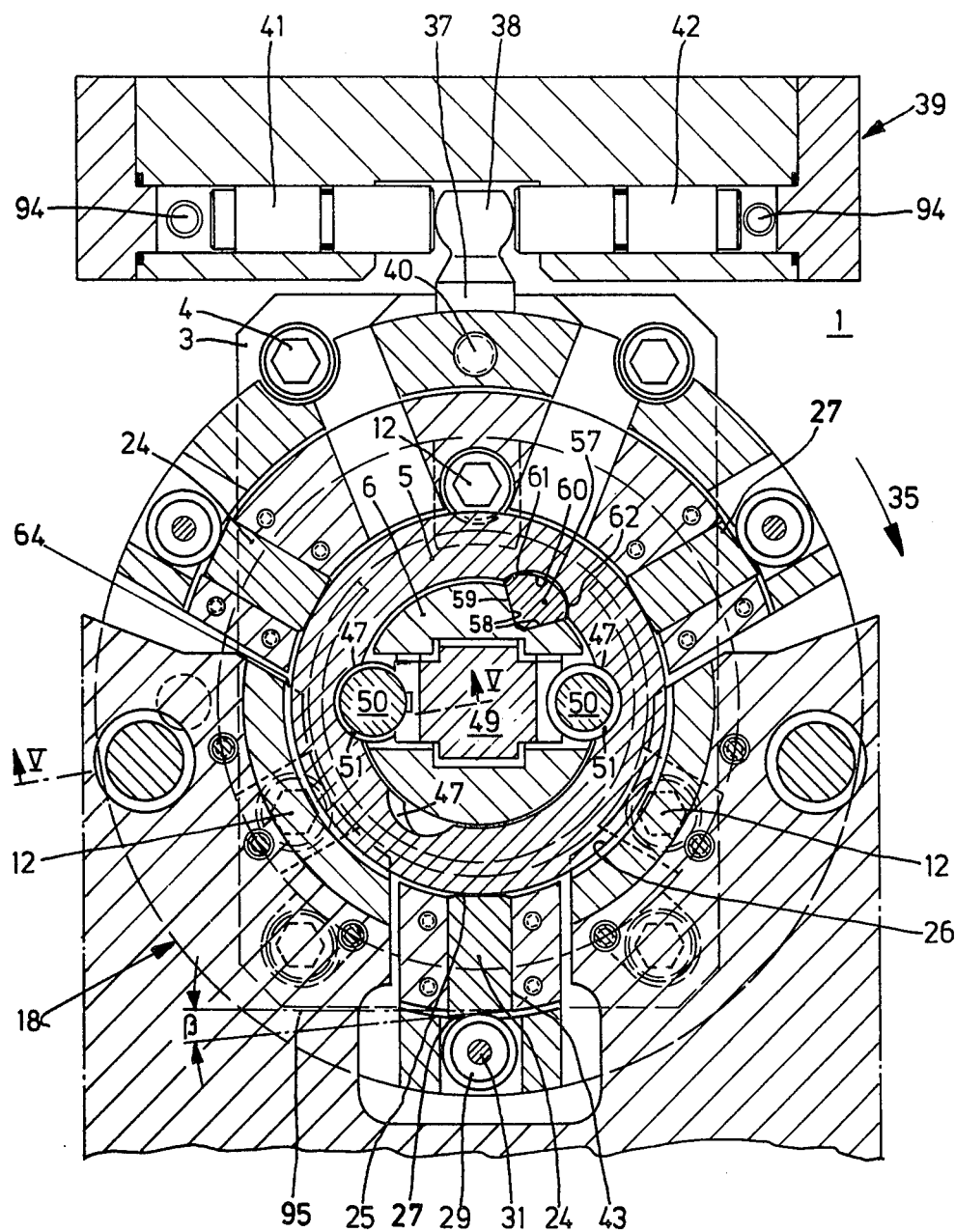
FIG. 3 shows a horizontal section through the workpiece holder along line III—III in FIG. 2.
Figure 4:
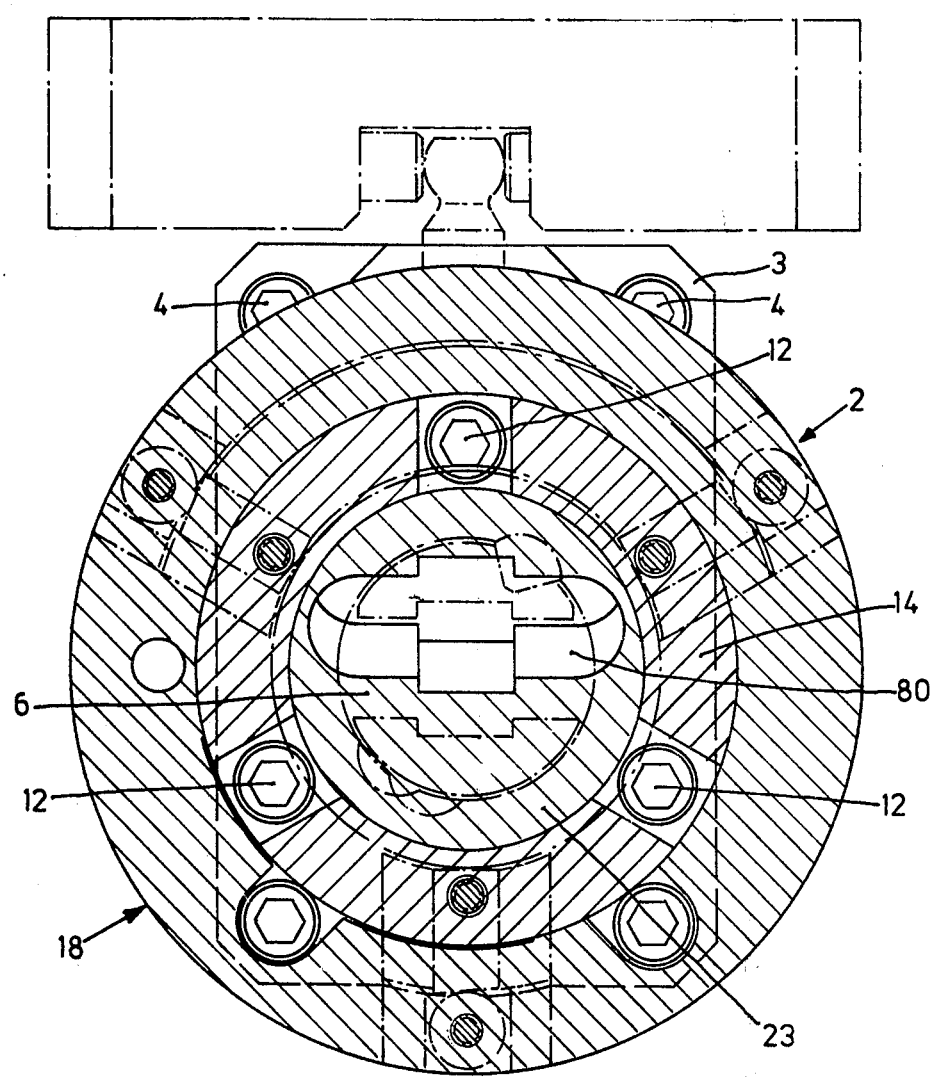
FIG. 4 shows a section through workpiece holder along line IV—IV in FIG. 2.
Figure 5:
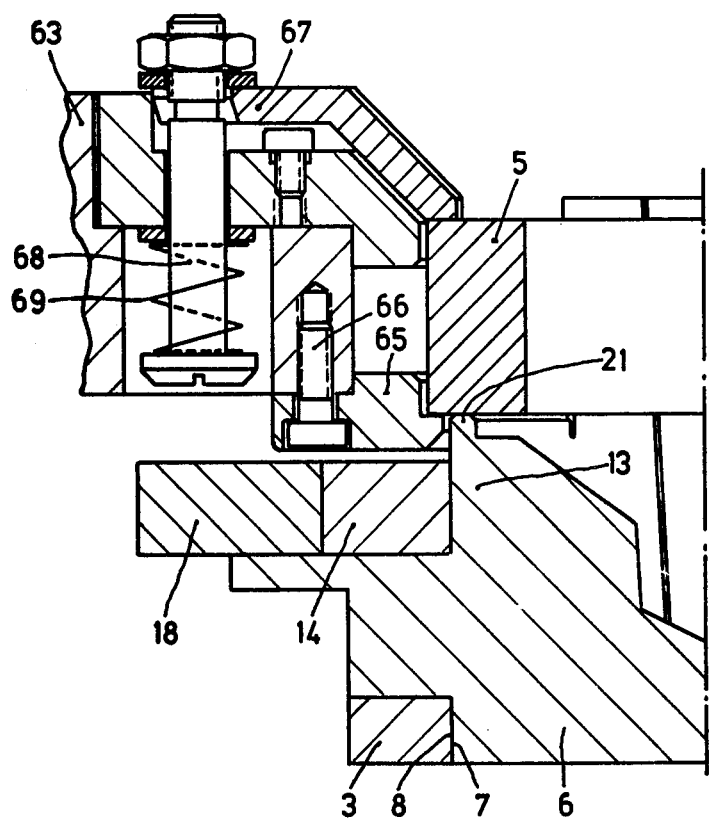
FIG. 5 is a vertical section along line V—V in FIG. 3.

The slope angle beta between guide surface 27 of a centering piece 24 and tangent 95 on a circle around the center of workpiece 5 in the contact area between pressure roller 29 and guide surface 27, as shown in FIG. 3, is small, for example 0° to 3°.

It will be obvious to those skilled in the art that various changes may be made without departing from the scope of the invention and the invention is not to be considered limited to what is shown in the drawings and described in the specification.

What is claimed is:

1. A workpiece holder for a vertical broaching machine for broaching an annular workpiece, comprising:
    non-rotatable support means, on which the workpiece is received, for axially supporting the workpiece from below, said support means having a portion projecting into the center aperture of the workpiece;
    tangential immobilization means, insertable between the portion of said support means projecting into the center aperture and the inner surface of the workpiece, for tangential immobilization of the workpiece; and
    radial immobilization means for radial immobilization of the workpiece when in place on said support means, said radial immobilization means comprising:
    at least two centering pieces disposed about the outer surface of the workpiece when in place on said support means, and
    a common drive means for simultaneously driving all of said centering pieces into radially pressing engagement with the exterior of the workpiece.

2. Workpiece holder according to claim 1, including at least three of said centering pieces.

3. Workpiece holder acording to claim 1, wherein said drive means comprises a bilaterally actuatable hydraulic drive means.

4. A workpiece holder according to claim 1 wherein said radial immobilization means further include an inner ring fixedly disposed with respect to said support means, said inner ring having radial guide groove means therein for receiving said centering pieces in a radially displaceable but tangentially non-displaceable manner.

5. A workpiece holder according to claim 1 wherein said centering pieces each have a sloping guide surface on the radially exterior surface thereof and wherein said drive means includes an outer ring tangentially rotatable with respect to said support means and pressure rollers mounted in said outer ring and engageable with the sloped guide surfaces of said centering pieces to force said centering pieces radially inwardly when said outer ring is rotated.

6. Workpiece holder according to claim 5, wherein the sloping guide surfaces of said centering pieces are inclined at only a small angle relative to the corresponding tangent to a circle around the center of the workpiece in the contact area between the corresponding guide surfaces and the corresponding pressure rollers.

7. A workpiece holder according to claim 4 wherein said centering pieces each have a sloping guide surface on the radially exterior surface thereof and wherein said drive means includes an outer ring tangentially rotatable with respect to said support means and pressure rollers mounted in said outer ring and engageable with the sloped guide surfaces of said centering pieces to force said centering pieces radially inwardly when said outer ring is rotated.

8. Workpiece holder according to claim 4, including at least three of said centering pieces.

9. Workpiece holder according to claim 5, including at least three of said centering pieces.

10. Workpiece holder according to claim 7, including at least three of said centering pieces.

* * * * *